(12) United States Patent
Teh et al.

(10) Patent No.: US 7,587,547 B2
(45) Date of Patent: Sep. 8, 2009

(54) DYNAMIC UPDATE ADAPTIVE IDLE TIMER

(75) Inventors: Chee Hak Teh, Penang (MY); Suryaprasad Kareenahalli, Folsom, CA (US); Zohar Bogin, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 57 days.

(21) Appl. No.: 11/394,461

(22) Filed: Mar. 30, 2006

(65) Prior Publication Data

US 2007/0233943 A1    Oct. 4, 2007

(51) Int. Cl.
*G06F 12/00* (2006.01)
(52) U.S. Cl. .................... 711/105; 711/167
(58) Field of Classification Search ............ 711/105, 711/167, 154
See application file for complete search history.

(56) References Cited

U.S. PATENT DOCUMENTS

| | | | |
|---|---|---|---|
| 6,571,323 B2 * | 5/2003 | Lai et al. | 711/160 |
| 6,799,241 B2 * | 9/2004 | Kahn et al. | 711/105 |
| 6,910,114 B2 | 6/2005 | Kareenahalli et al. | |

FOREIGN PATENT DOCUMENTS

WO    WO 03/058456 A1    7/2003

* cited by examiner

*Primary Examiner*—Hyung S Sough
*Assistant Examiner*—Mehdi Namazi
(74) *Attorney, Agent, or Firm*—Lee & Hayes, PLLC (57) ABSTRACT

The invention describes a technology for closing DRAM pages, wherein the invention allows for dynamically changing code streams by tracking the previous decisions made on page closes and adjusts dynamically during DRAM operation to compensate for bad page close decisions made.

20 Claims, 8 Drawing Sheets

DYNAMIC UPDATE ADAPTIVE IDLE TIMER

BACKGROUND

Computing devices typically include memory controllers to control access to memory, e.g., by a processor, to read and write data. For instance, memory may be configured as Dynamic Random Access Memory (DRAM), which provides the "main memory" of the computing device that is used to store data for use by the processor, such as computer-executable instructions, data for further processing according to the computer-executable instructions, and so on.

One technique that has been utilized to improve the efficiency of access to the DRAM is to close a "page" to main memory when traffic to the memory has been idle for a predetermined amount of time, which may be referred to as an "idle time". Thus, future requests to the memory will be performed with "page empty" timing and therefore do not encounter additional overhead to close the page before another page is opened. A performance gain, for example, may be encountered when a future request results in more "page misses" (e.g., a different page than the one that is open is subject to a next memory transaction) than "page hits". Therefore, if the "missed" page is already closed, the overhead in requesting another page is minimized.

Traditional techniques that were utilized to set the idle time, however, were set by a Basic Input Output System (BIOS) at start up and were not changed during operation of the memory controller. Therefore, these traditional techniques were static and thus unable to address changes in data encountered by the memory controller.

BRIEF DESCRIPTION OF THE DRAWINGS

The same reference numbers are utilized in instances in the discussion to reference like structures and components.

DETAILED DESCRIPTION

In the following discussion, exemplary devices are described which may provide and/or utilize a dynamic update adaptive idle timer. Exemplary procedures are then described which may be employed by the exemplary devices, as well as by other devices without departing from the spirit and scope thereof.

Exemplary Devices

Figure 1:
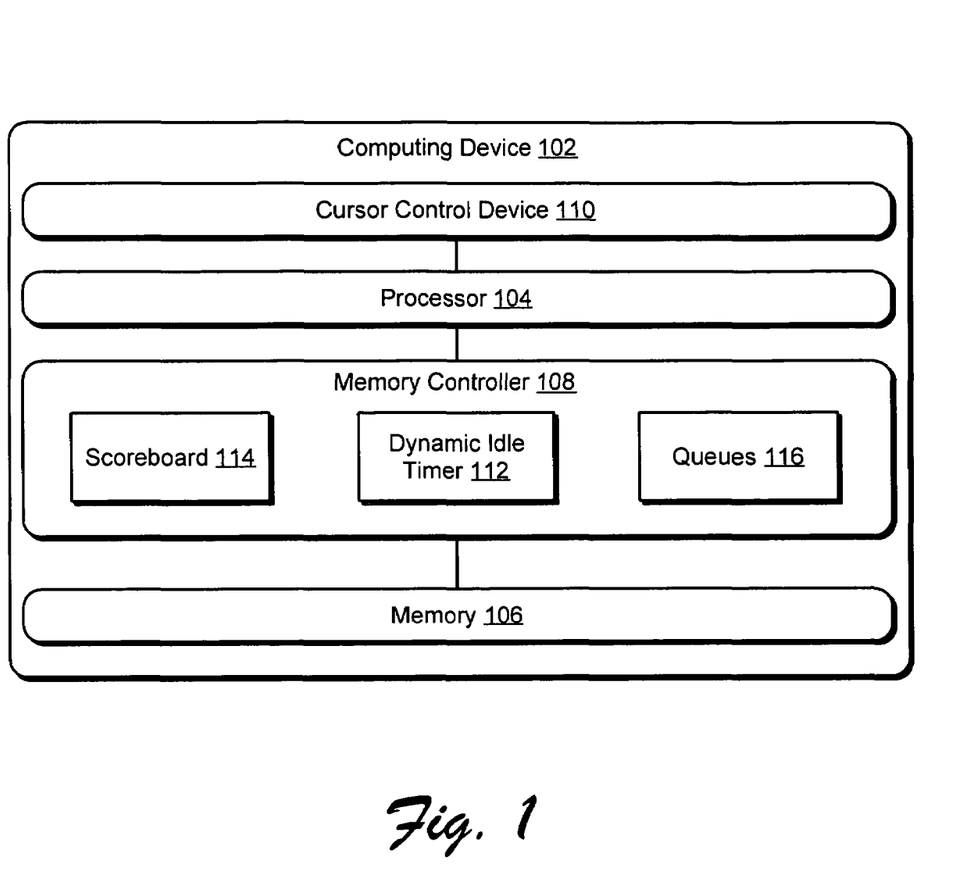
FIG. 1 is an illustration of an exemplary implementation of a computing device that is operable to perform the dynamic update idle timer techniques.

FIG. 1 illustrates an exemplary implementation 100 of a computing device 102 that is operable to employ dynamic update adaptive idle timer techniques. The computing device 102 may be configured in a variety of ways, such as a traditional desktop computer (e.g., a desktop PC), a server, a notebook computer, a personal information appliance, and so on. Thus, the computing device 102 may be configured as a "thick" computing device having significant processing and memory resources (e.g., a server) to a "thin" computing device having relatively limited processing and/or memory resources, such as a personal information appliance. A wide variety of other configurations are also contemplated.

The computing device 102, as illustrated in FIG. 1, includes a processor 104, memory 106, a memory controller 108 and a cursor control device 110. The cursor control device 110 (e.g., a mouse, touch screen, track pad, and so on) is communicatively coupled to the processor 104 via a bus, such as via a host bus in a graphics memory controller hub. The processor 104 may be configured in a variety of ways, and thus, is not limited by the materials from which it may be formed or the processing mechanisms employed therein. For example, the processor may be comprised of semiconductor(s) and/or transistors (e.g., electronic integrated circuits (ICs)), and so on. Additionally, although a single processor 104 is illustrated, the processor 104 may be representative of multiple processors that are communicatively coupled to the memory controller 108 through use of a bus.

Likewise, the memory 106, which may be representative of "main memory" of the computing device 102, is configurable in a variety of ways. For example, memory 106 may be configured as DRAM, which may include synchronous DRAM (SDRAM), Rambus DRAM (RDRAM), Double Data Rate synchronous DRAM (DDR DRAM), and so on.

The memory controller 108 is configured to service "memory requests" (which may also be referred to hereafter as "requests"), which as used herein, refer to a transfer of command and address between an initiator and the memory 106. For example, a "read memory request" is a transfer of data from the memory 106 to an initiator. Processor 104, for instance, may initiate the read memory request (e.g., in response to an input received from the cursor control device 110) to transfer data from the memory 106 to the processor 104. A "write memory request" is a transfer of data from the initiator to the memory 106. Continuing with the previous example, the processor 104 may initiate a write memory request to transfer data from the processor 104 to the memory 106. Control information (e.g., a priority level and a read/write nature of the memory request) may be conveyed as a part of the memory request, through use of a predefined protocol with respect to conveyance of the address, and so on.

The memory controller 108, in an implementation, is configured to transfer data between the memory 106 and the processor 104 through the use of "pages". For instance, a "page" may refer to a block of data that is stored within a row of one or more DRAMs that implement the memory 106. The row in this instance is accessed via a row address provided by the memory controller 108, and then the column address of the particular data being addressed is provided. Another column address may also be used to access additional data within the row without providing the row address again, which may be referred to as a "page hit". Reading or writing additional data from the same row in this manner (which may be referred to as "page mode") provides for less latency when accessing the data, because column accesses may be performed without providing the row address in between the column accesses and without closing a currently "open" page that is not being accessed. Thus, this may result in improved efficiency in the utilization of the memory 106.

When a memory read request hits an "open" page, the memory read request is sent to the memory controller 108 where it is serviced. In an implementation, the memory controller 108 records the page (e.g., a row portion of the address) of the current memory request in page registers in the memory controller 108. If, within an idle time period (further discussion of which may be found below), another memory request is detected and is directed to the same page as the current memory request, which may be detected by comparing the page recorded in the page registers, then the current data transfer may be continued without closing the page.

The memory controller 108 may then convey an address of the selected memory request to the memory 106 along with corresponding control information via a bus. In an implementation, the control information includes a write-enable line (e.g., data mask of a double data rate (DDR) protocol) to indicate which byte of data to write, a row-address line to indicate a row portion of the address that is being conveyed, and a column address line to indicate the column address that is being conveyed. If the request is a read, the selected data is provided by the memory 106.

When the incoming agent accesses another page (i.e., is a "miss"), then a current page (if any) is closed and the other page is accessed by providing a row address of the memory request, then the corresponding column addresses.

As previously described, one technique that may be utilized to improve the efficiency of access to the memory 106 is to close a page to the memory 106 when traffic to the memory has been idle for a predetermined amount of time, which may be referred to as an "idle time". Therefore, future requests to the memory will be performed with "page empty" timing and therefore do not encounter additional overhead to close the page before another page is opened.

In order to determine whether and when to close pages to memory 106, the memory controller 108 may employ a dynamic idle timer 112 and a scoreboard 114. The scoreboard 114 is configured to track existence of pending requests stored in queues 116 to the memory 106 that are to be processed by the memory controller 108. For example, the scoreboard 114 may track rank and bank of memory 106 being addressed. When there are no pending memory requests, the scoreboard 114 may provide an indication to the dynamic idle timer 112 to begin a countdown to close current pages.

The dynamic idle timer 112 is configured to utilize techniques to close the pages and to address dynamically-changing code streams by tracking the previous decisions made on page closes. The dynamic idle timer 112 may also adjust dynamically during operation to compensate for "bad" page close decisions as well as "good" decisions to increase the number of subsequent "good" decisions. For instance, the dynamic idle timer 112 may employ a "scaling" technique that transitions through a scale of predetermined timeout values based on previous decisions made to close pages, whether the decisions are "good" or "bad". Thus, the dynamic idle timer 112 may predict behavior of upcoming code streams based on previous code streams and adjust an idle time, through use of the timeout values accordingly, that is used to determine when to close the pages. Further discussion of the dynamic idle timer 112 may be found in relation to the following figure. Although the exemplary implementation 100 of FIG. 1 illustrates components that are representative of functionality as separate, these components may be further combined (e.g., the processor 104 and memory controller 108 may be formed via the same die), divided, and so on without departing from the spirit and scope thereof.

Figure 2:
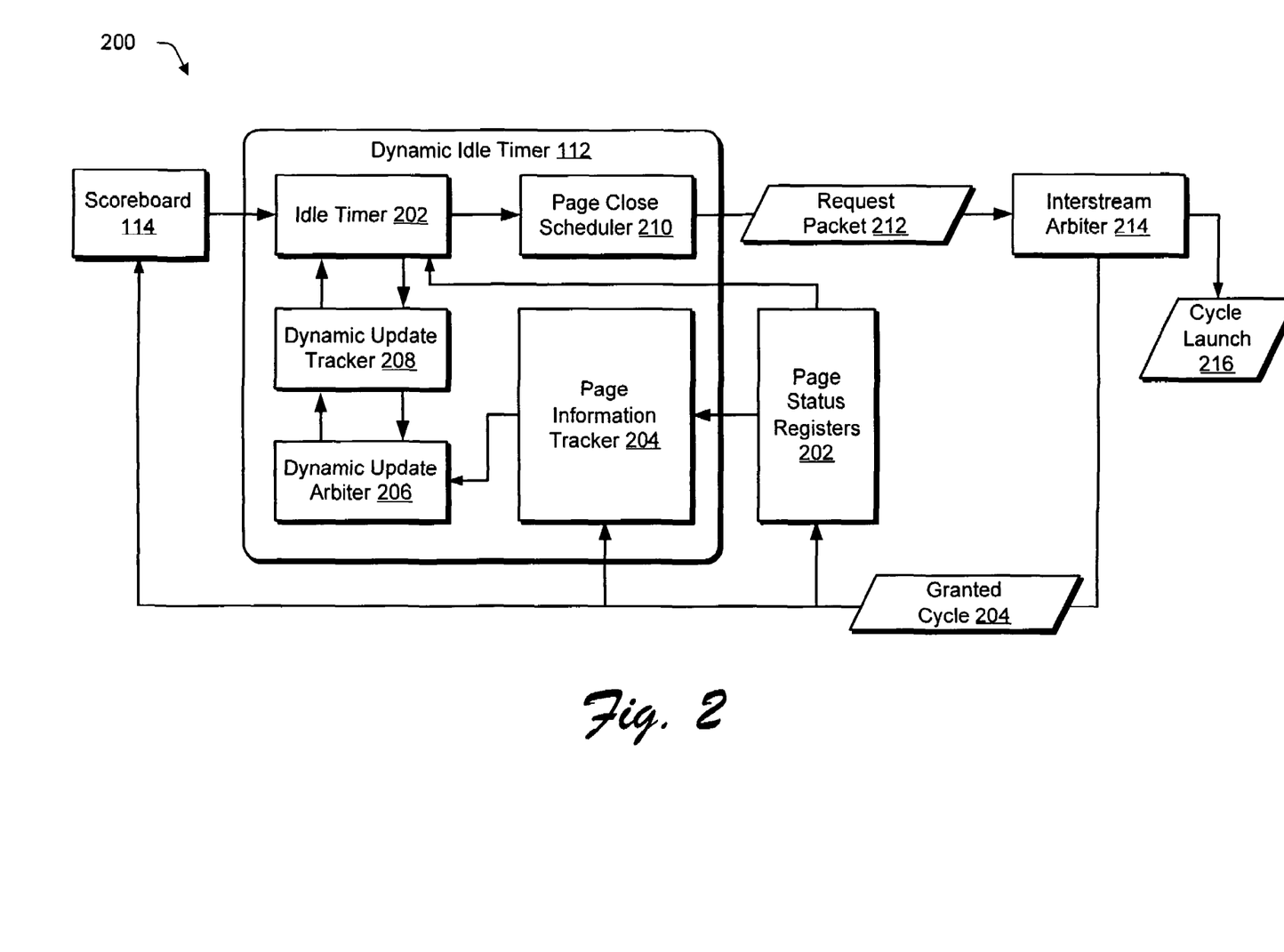
FIG. 2 is an illustration of an exemplary implementation showing a dynamic idle timer of FIG. 1 in greater detail.

FIG. 2 is an illustration of an exemplary implementation 200 showing the dynamic idle timer 112 of FIG. 1 in greater detail. The dynamic idle timer 112 of FIG. 2 includes five components which are labeled as an idle timer 202, a page information tracker 204, a dynamic update arbiter 206, a dynamic update tracker 208 and a page close scheduler 210.

The idle timer 202 is representative of a main counter to count a number of idle cycles for both opened and closed pages, which is duplicated for each rank/bank. The page information tracker 204 tracks current and previous page status information and generates page close decision interpretations, which are duplicated for each rank/bank, an output of which is provided to the dynamic update arbiter 206 and the dynamic update tracker 208.

The dynamic update arbiter 206 handles arbitration for ownership of the dynamic update tracker 208 between each of the ranks/banks when an update of the page close decisions is to be performed. The dynamic update tracker 208 may be implemented as a watermark-based credit/debit tracker that manages incrementing/decrementing of the counter's time of the idle timer 202. The dynamic update tracker 208 also provides logic to increment or decrement the timeout value for the winning rank/bank that was arbitrated by the dynamic update arbiter 206. The page close scheduler 210 arbitrates page close requests from each of the rank/bank idle timers 202 and presents a request packet 212 to an interstream arbiter 214 for cycle launch 216.

The scoreboard 114 presents the idle timer 202 with an indication when there are no pending requests to a particular rank/bank in each of the memory controller's read/write queues. The idle timer 202 will then begin the countdown from a timeout value (controlled by the dynamic update tracker 208 and the dynamic update arbiter 206) and present a page close request to the page close scheduler 210 when the countdown expires. The page information tracker 204 tracks previous page status information and page close decisions based on the history of the cycles launched and present update requests to the dynamic update arbiter 206. The dynamic update arbiter 206 is configured to arbitrate between multiple update requests from the ranks/banks and present winning rank/bank information to the dynamic update tracker 208 to update a timeout value for the corresponding rank/bank for future page closes.

Figure 3:
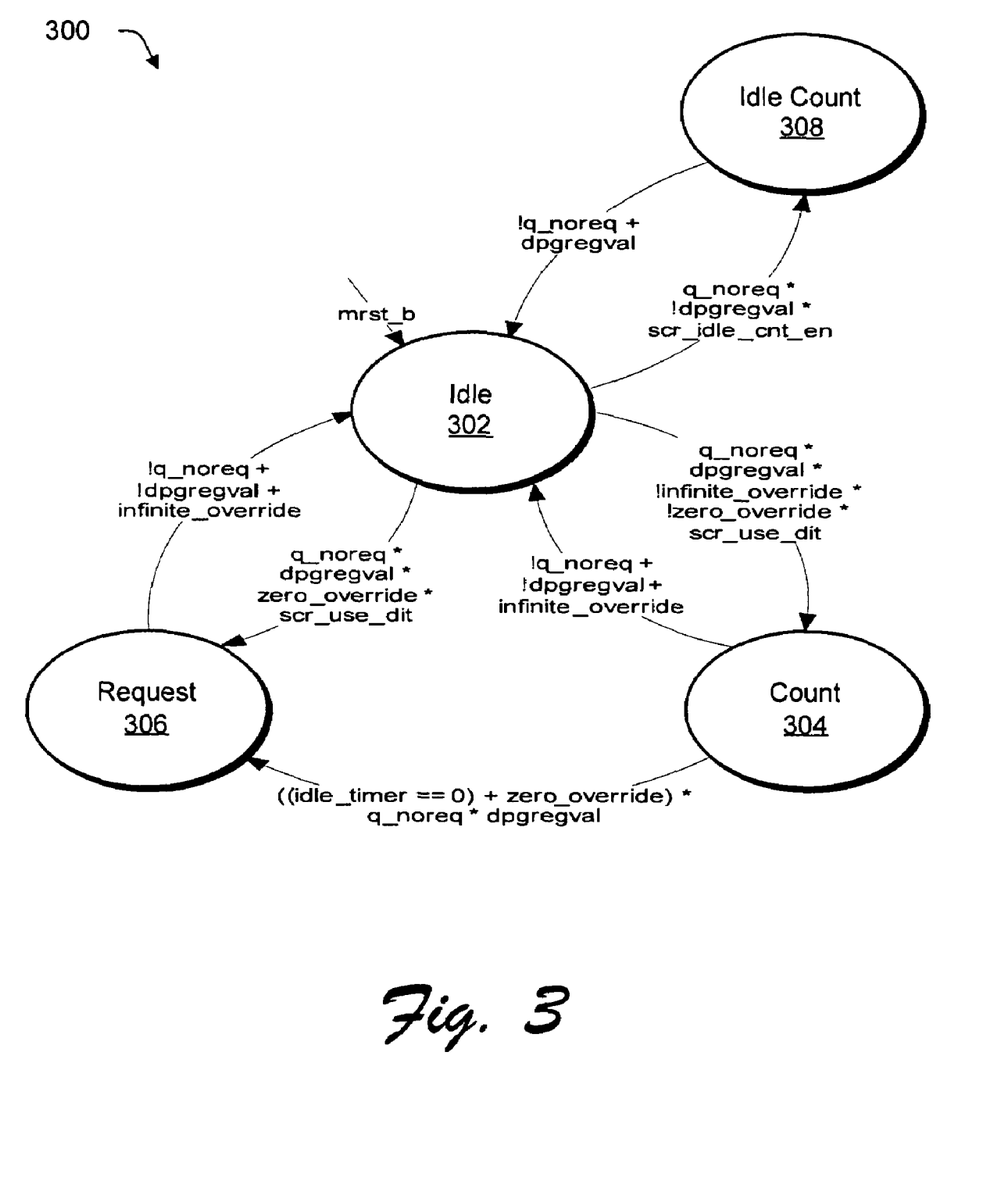
FIG. 3 illustrates an exemplary implementation of a state machine that is operable to control a counter of an idle timer of FIG. 2.

FIG. 3 illustrates an exemplary implementation of a state machine 300 that is operable to control a counter of the idle timer 202 of FIG. 2. The idle timer 202 is a "main" timer block that is configured to count down from a timeout value to control page closes, control of which may be performed by the state machine 300 of FIG. 3.

The state machine includes an idle 302 state, a count 304 state, a request 306 state and an idle count 308 state. The idle 302 state is a state, during which, memory registers of the memory controller 108 are idle, e.g., are opened with pending requests or closed.

The count 304 state causes the idle timer 202 to perform a countdown for opened pages that have no pending requests. The request 306 state is entered when the idle timer 202 has timed out to assert page close request for the bank to the page close scheduler 210. Requests remain asserted until serviced by the page close scheduler 210 while in this state. The idle count 308 state causes an idle cycle countdown to be performed for closed pages, which may be used to compensate for data streams with intermittent bursts of "bad" decisions such that it does not influence overall decisions of the dynamic update tracker 208. Arc term descriptions for the state machine 300 of FIG. 3 are described as follows, which is then followed by a description of transitions between the states of the state machine 300.

"mrst_b"
Active low reset of the state machine 300.

"q_noreq"
There is no request pending from each of the queues 116 to the rank/bank.

"dpgregval"
A particular page (i.e., rank/bank) is open.

"idle_timer"
The idle timer 202 is the actual counter that counts down from the timeout value upon entering the count 304 state.

"infinite_override"
The countdown timeout value may be set to "infinite" (e.g., "FFh") to indicate infinite idle countdown time to prevent page close requests from ever asserting "zero_override"
Countdown timeout value may be set to "zero" (e.g., "00h") to indicate a zero idle countdown time for immediate page close requests "scr_use_dit"
This is a configuration bit which indicates that the idle timer 202 is enabled.

"scr_idle_cnt_en"
This is a configuration bit to indicate that the idle cycle countdown for closed pages is enabled.

Upon reset, the state machine 200 enters the idle 302 state. When a page is opened that does not have pending requests from each of the queues and the countdown timeout values are not zero (e.g., "00h") or infinite (e.g., "FFh") and the idle timer 202 is enabled, the state machine 200 transitions to the count 304 state. This indicates that the rank/bank is ready for opportunistic page closes and will trigger the loading of the countdown timer with the timeout value.

While in the count 304 state, the counter of the idle timer 202 continually counts down each memory clock from the timeout value until it reaches zero. When a page was closed before the idle timer 202 expires (such as due to a request to the memory 106, the idle timer 202 was programmed/dynamically moved to an infinite value, and so on), the idle timer 202 will transition back to the idle 302 state.

Transitioning from the count 304 state to the request 206 is triggered when the following conditions are satisfied:
The idle timer 202 timed out (idle_timer==0) OR timeout value is programmatically/dynamically moved to zero (e.g., "00h") (zero_override), AND
There is still no request to that bank (q_noreq), AND
The page is still opened (pgregvalid).

When in the request 306 state, the idle timer 202 asserts a page close request (pgclose_req) to the page close scheduler 210 if it is safe to issue a pre-charge (prech_safe) and transitions back to the idle 302 state when the page is closed. In other words, the idle timer 202 asserts the "pre-charge" to close a current page and transitions to the idle 302 state when the page is closed. It should also be noted that there is a direct arc from the idle 302 state to the request 306 state for cases where the timeout value is zero (e.g., "00h") and it is safe to issue a pre-charge command (i.e., close a current page) immediately.

The idle timer 202 may also function as an alternate timer when the rank/bank is idle and closed. This is represented in the state machine 300 by the idle count 308 state. The idle count 308 state is entered when the bank is idle with no pending request to that rank/bank and the rank/bank is closed. This triggers the idle counter 202, if it is enabled (scr_idle_cnt_en), to count a number of idle cycles, during which, the bank closed. At regular intervals (scr_idle_cnt[7:0]), the idle counter 202 is credited with a "reward" to offset a sequence of "bad" page close decisions when spaced a sufficient amount of time apart, further discussion of which may be found in relation to the following figure.

Figure 4:
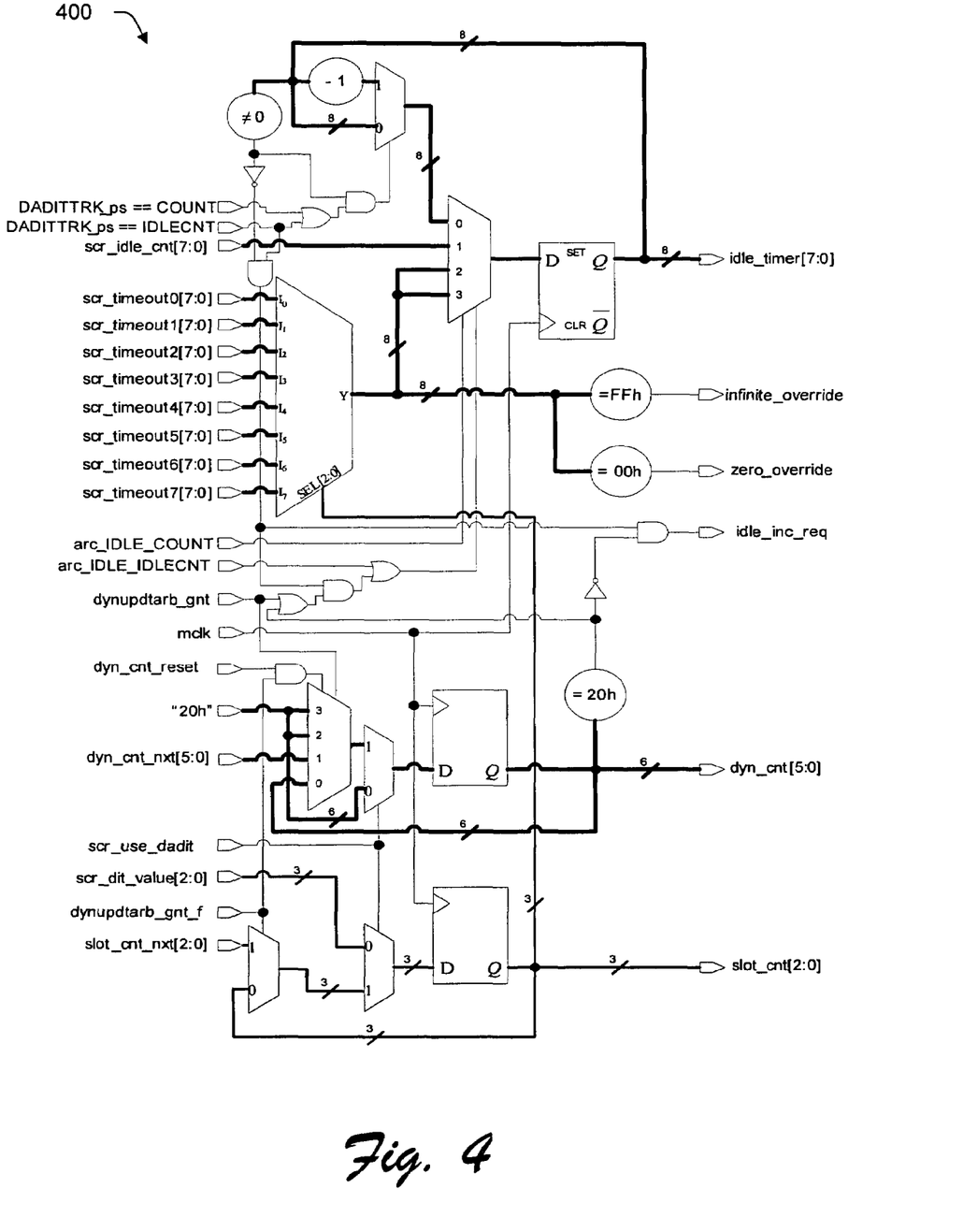
FIG. 4 illustrates an exemplary implementation of a countdown timer for the idle timer of FIG. 2.

FIG. 4 illustrates an exemplary implementation of a countdown timer for the idle timer 202. As previously described, the idle timer 202 continually counts down until it reaches zero and stays there until a new timeout value is loaded. The countdown occurs when the state machine 300 is in the count 304 state or idle count 308 state. The illustrated "dyn_cnt" and "slot_cnt" flops of FIG. 4 serve as a storage point for the watermark-based scheme in the dynamic idle timer 112. The "slot_cnt" may also be used as an index into an eight-bit 8:1 multiplexer that contains the predetermined (e.g., pre-programmed) timeout values (illustrated as "scr_timeout" in FIG. 4) to be used for the idle timer 202. It should be noted that the structures of FIGS. 3 and 4 are duplicated for rank/bank.

The dynamic update arbiter 206 arbitrates requests from each of the banks that request use of the dynamic update tracker 208. The dynamic update arbiter 206, for instance, may examine each of the valid requests from each bank and decide on a best candidate to take ownership of the dynamic update tracker 208 to update its "dyn_cnt" and "slot_cnt" values. In this way, a reduced gate count may be obtained by sharing use of the dynamic update tracker 208.

Arbitration for the dynamic update tracker 208 may be performed using two tiers. The first tier of arbitration is based on a first available algorithm with a lowest rank having a highest priority followed by a lowest bank, which may be similar to the page close scheduler 210. The arbitration is performed on the qualified "idle_inc_req" from each rank/bank's idle timer. A qualified "idle_inc_req" (i.e., idle count "reward") describes any rank/bank that asserts "idle_inc_req" because the idle timer 202, when in an "idle count" state, expired and the scale is not at the "center", e.g., at a "20h" count. This significantly reduces the amount of "idle_inc_req" that is arbitrated by not arbitrating for requests that will not result in a change to the scale.

The winner of the first tier is given ownership of the dynamic update tracker 208 when there are no page invalid hit (PIH), page invalid miss (PIM), page valid hit (PVH) or page valid miss (PVM) indications received from the page information tracker 204 for each of the banks. Else, any bank that asserts its page information status is given priority for ownership. This implementation assumes PIH, PIM, PVH and PVM are mutually exclusive from an architectural standpoint, since the interstream arbiter 214 grants a single cycle to each bank at a given clock cycle, although other implementations are also contemplated.

The bank that won the arbitration will have all the following attributes multiplexed out and sent to the dynamic update tracker 208 in the next clock cycle:
Page invalid hit (PIH);
Page valid miss (PVM);
Reward indication (reward), which is asserted if the reward for the dynamic idle timer 112 is enabled and encompasses good decisions (PVH and PIM) and "idle_inc_req";
Dynamic update count (dyn_cnt[5:0]); and
Rank/bank index granted in the previous clock.

The following is then multiplexed and sent in the next 2 clock cycles:
Slot count (slot_cnt[2:0]);
Zero count override (zero_override);

Infinite count override (infinite_override); and
Rank/bank index granted two clock cycles ago.

The dynamic update tracker 208 tracks the number of "good" and "bad" page close decisions made by the idle timer 202, examples of which are shown in the following table. The dynamic update tracker 208, for instance, may be implemented as a six-bit scale. In an implementation, the counter is preset to a center of the scale (e.g., "20h") whenever it triggers a threshold or if reset is asserted.

| Decision | Page Status | Hit/ Miss | Good/ Bad | Description |
|---|---|---|---|---|
| Page Invalid Hit (PIH) | Invalid | Hit | Bad | Page was closed too early and the next access to that bank was a page hit |
| Page Invalid Miss (PIM) | Invalid | Miss | Good | Page was closed early enough and the next access to that bank was a page miss |
| Page Valid Hit (PVH) | Valid | Hit | Good | Page was not closed too early and the next access to that bank was a page hit |
| Page Valid Miss (PVM) | Valid | Miss | Bad | Page was closed too late and the next access to that bank was a page miss |

These decisions are used to scale between the predetermined counter values as follows. A transition is performed (e.g., "down" a level in the scale of timeout values) to a timeout value having a relatively lesser amount of time when a predetermined number "bad" decisions are encountered due to the timeout value being too "large", i.e., an amount of time referenced by the timeout value. For example, when a PIH is followed by four PVM, and a low-watermark threshold is set to three counts below "20h" (i.e., at 1 Ch), a transition may be performed through a six-bit watermark-based scale to "21h" when the PIH is encountered and move "back" to "20h" on a first PVM encountered. Transitions will also be performed to "1Fh", "1Eh" and "1Ch" for the next three PVMs encountered, respectively. Because the low watermark is set to "1Ch", it will trip the 6-bit watermark on the low phase causing the "slot_cnt" to select a lower slot that was programmed to a timeout value describing a relatively lesser amount of time for that rank/bank. Once it has tripped, the 6-bit watermark-based scale will reset back to "20h" count for that rank/bank.

When a "reward" is enabled, and one PIH is followed by three PVMs, one "good" decision, and one PVM, transitions would be performed as follows. The scale would go from "20h" to "21h" (for the PIH), to "20h" (first PVM), to "1Fh" (second PVM), to "1Eh" (third PVM), to "1Fh" ("good" decision"), and finally "1Eh" for the fourth PVM. Since the low watermark was programmed to "1Ch" in this example, the low watermark was not tripped because it was offset by one "good" decision and therefore it will take more PVMs to trip the low watermark. This is to account for the need for an additional pre-charge command (i.e., close page). A similar transition is performed "up" a level in the scale of timeout values to a timeout value having a relatively greater amount of time when a predetermined number of "good" decisions are encountered.

A transition is performed to another timeout value that references an amount of time that is closer (e.g., by one level) to a center (e.g., "20h") of the scale when a page invalid miss or page valid hit is observed. This accounts for improved latency by an additional pre-charge or activate command. Further, a transition is performed to move closer to a center of the scale when a predetermined number of counts have occurred, during which, traffic between the memory and the memory controller has not happened. This offsets cases where relatively long cycles of inactivity on closed pages after a series of relatively widely spaced "bad" decisions are observed as previously described in relation to the idle count 308 state of FIG. 3.

As previously described, ownership of the dynamic update tracker 208 is arbitrated by the dynamic update arbiter 206. Once ownership has been established, update information for the winning rank/bank are multiplexed out and sent to the idle timer 202 to update the "dyn_cnt" and the "slot_cnt". The immediate page information is used to update the "dyn_cnt" scale in the idle timer 202 for that rank/bank in the next clock cycle. In the following clock cycle, the "slot_cnt" for that rank/bank is updated.

The dynamic update tracker 208 may also contain two programmable watermark levels e.g., "high" and "low" watermarks. If the "high" watermark is reached, the "slot_cnt" moves to a "higher" slot, e.g., a level in the scale describing a relatively greater timeout value. Typically, the higher slot is programmed to a timeout value that is more than the current slot and thus this will increment the timeout value used by the idle timer 202. Likewise, when the low watermark is reached, the "slot_cnt" moves to a lower slot (e.g., a level in the scale describing a relatively lesser timeout value) thus decrementing the timeout value to the idle timer 202. Slot movement may be capped if the timeout value at any slot is programmed to zero (e.g., "00h") or infinite (e.g., "FFh") to limit the slot range, i.e., the range of the scale. For example, a slot range of eight slots (i.e., levels) may be programmed.

The scale of the dynamic update tracker 208 for the winning rank/bank may be reset to a center (e.g., "20h") of the scale if:

Reset is asserted, OR
The high watermark was tripped, OR
The low watermark was tripped.

Further discussion of interaction between the dynamic update tracker 208 and the dynamic update arbiter 206 may be found in relation to the following figure.

Figure 5:
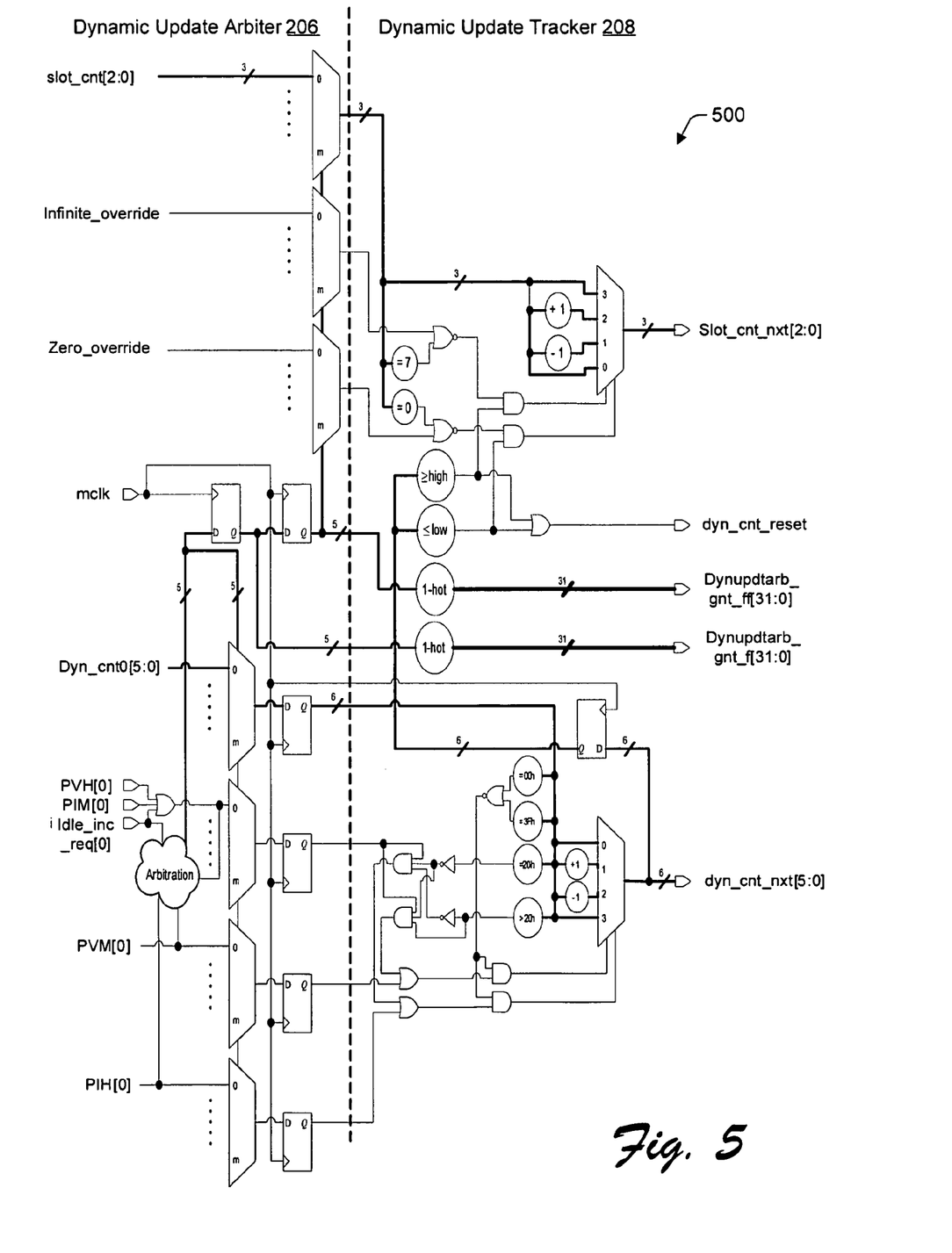
FIG. 5 illustrates exemplary interaction between a dynamic update arbiter and a dynamic update tracker of the dynamic idle timer of FIG. 2.

FIG. 5 illustrates exemplary interaction 500 between the dynamic update arbiter 206 and the dynamic update tracker 108. The PIH, PIM, PVH and PVM indications are generated from page registers of the memory controller 108 according to a state machine 600 of FIG. 6, which illustrates an exemplary state machine 600 for the page information tracker 204 to track page transitions.

Figure 6:
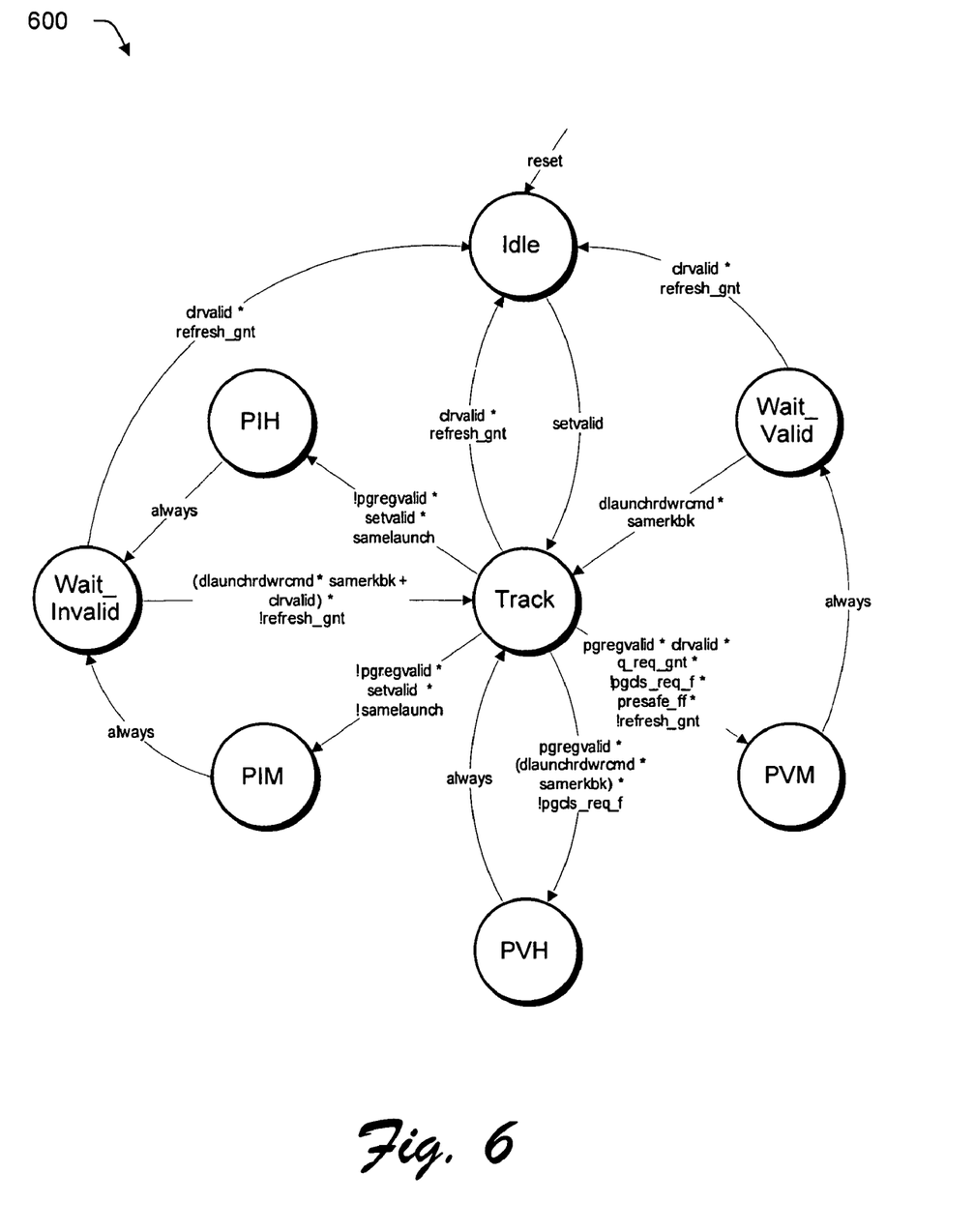
FIG. 6 is an illustration of an exemplary state machine for a page information tracker of FIG. 2 to track page transitions and generate "good" and "bad" decision indications to the dynamic update arbiter of FIG. 5.

Page information is generated when the state machine 600 is in the PIH, PIM, PVH or PVM states. The Wait_Valid and Wait_Invalid states are used to keep the page information tracker 204 in a pending state until the page recovers from a PVM or PIH/PIM to prevent erroneous crediting due to a previous decision. For example, crediting an activate command from a previous PVM or crediting a read/write launch from a previous PIH will offset the penalty from the PVM/PIH.

The following dictates the details of the page information tracker indications. The page invalid hit (PIH) is asserted when:

Page register for that rank/bank is invalid (!pgregvalid), AND

An activate command was launched to that rank/bank (setvalid), AND

The previous row address is equivalent to the current row address (samelaunch).

Page invalid miss (PIM) is asserted when:

Page register for that rank/bank is invalid (!pgregvalid), AND

An activate command was launched to that rank/bank (setvalid), AND

The previous row address is not equivalent to the current row address (!samelaunch).

Page valid hit (PVH) is asserted when:

Page register for that rank/bank is valid (pgregvalid), AND

A read/write command was launched to that rank/bank (dlaunchrdwrcmd*samerkbk), AND Page close request was not asserted for that rank/bank in the previous cycle (!pgcls_req_f).

Page valid miss (PVM) is asserted when:

Page register for that rank/bank is valid (pgregvalid), AND

Pre-charge or pre-charge all command was launched to that rank/bank (clrvalid), AND The request from one of the queues was granted (q_req_gnt), AND Page close request was not asserted for that rank/bank in the previous cycle (!pgcls_req_f), AND Pre-charge safe for that rank/bank has been asserted for at least 2 cycles (presafe_ff), AND Refresh command was not granted (!refresh_gnt).

As previously described, the dynamic idle timer 100 also includes a page close scheduler 210, which collects each of the page close requests from each rank/bank and arbitrates on the best candidate for a page close request to the interstream arbiter 214. In an implementation, there are two levels of arbitration for the page close scheduler 210, e.g., per bank and per rank.

The first level of arbitration decides on a best candidate for each of the banks in the same rank based on a first available request, e.g., from bank 0 to bank 7. The second level of arbitration decides on a best candidate for each of the ranks based on a first available request, e.g., from rank 0 to rank 3. In this example, this implies an arbitration order of bank 0 of rank 0, bank 0 of rank 1, bank 0 of rank 2, bank 0 of rank 3, bank 1 of rank 0, bank 1 of rank 1, and so on.

The page close scheduler 210 may also request for a "precharge all" cycle (e.g., a side band signal to the interstream arbiter 214) for a particular rank that has:

Two or more banks requesting a page close (potential_prechall_rk[3:0]), AND

Each of the banks in the rank are either requesting a page close (pgclose_req[31:0]) or page is invalid (!pgregvalid[31:0]) and it is safe to issue a pre-charge on the invalid page (prech1n_safe[31:0]).

Figure 7:
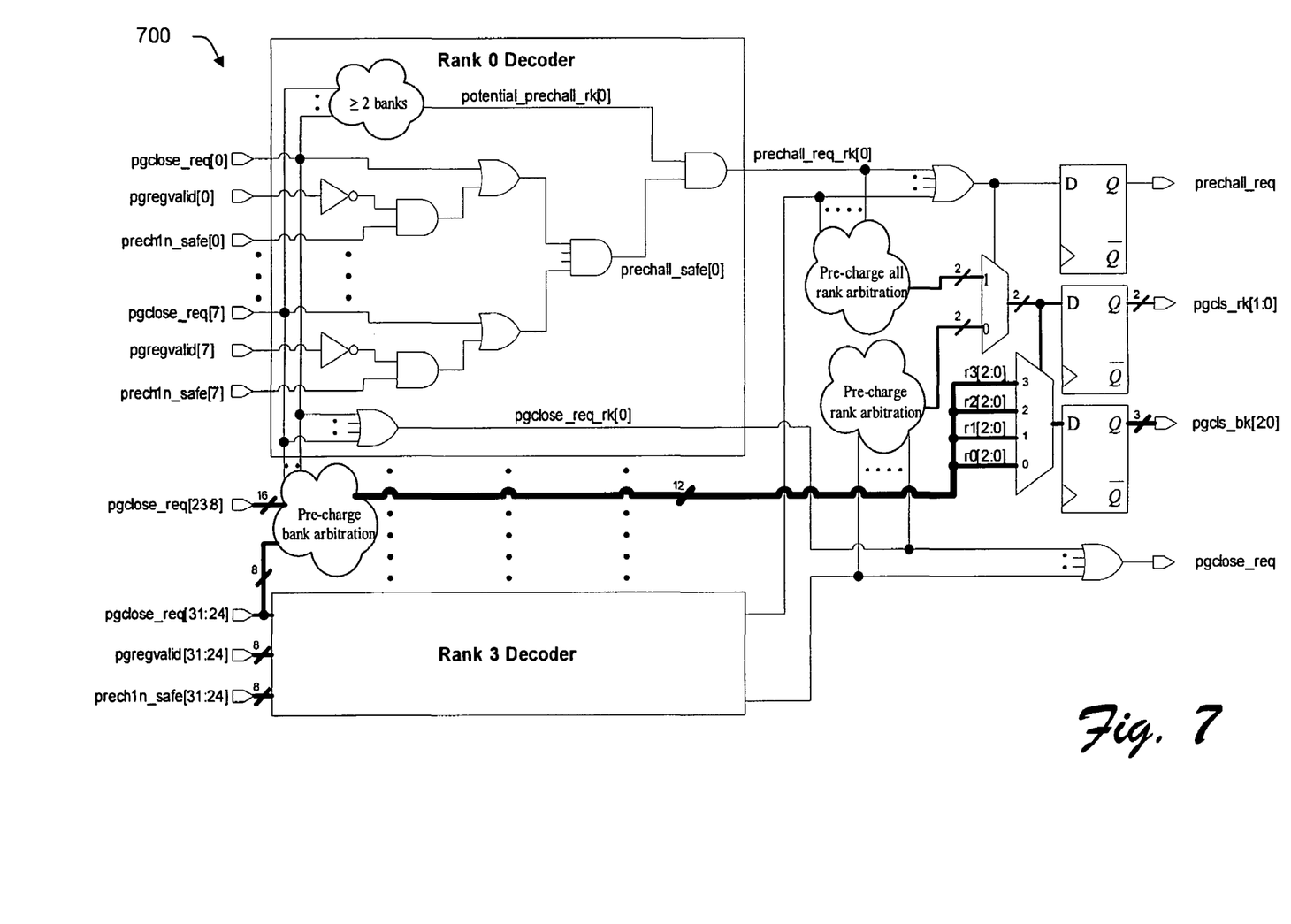
FIG. 7 is an illustration of an exemplary implementation of "pre-charge" and a "pre-charge all" request techniques.

A "pre-charge all" request may supersede page close requests from other banks/ranks. In an implementation, when multiple "pre-charge all" requests are asserted for more than one rank, the lowest rank may be serviced. FIG. 7 illustrates an exemplary implementation of this technique.

Exemplary Procedures

The following discussion describes dynamic update adaptive idle timer techniques that may be implemented utilizing the previously described systems and devices. The procedures are shown as a set of blocks that specify operations performed by one or more devices and are not necessarily limited to the orders shown for performing the operations by the respective blocks.

Figure 8:
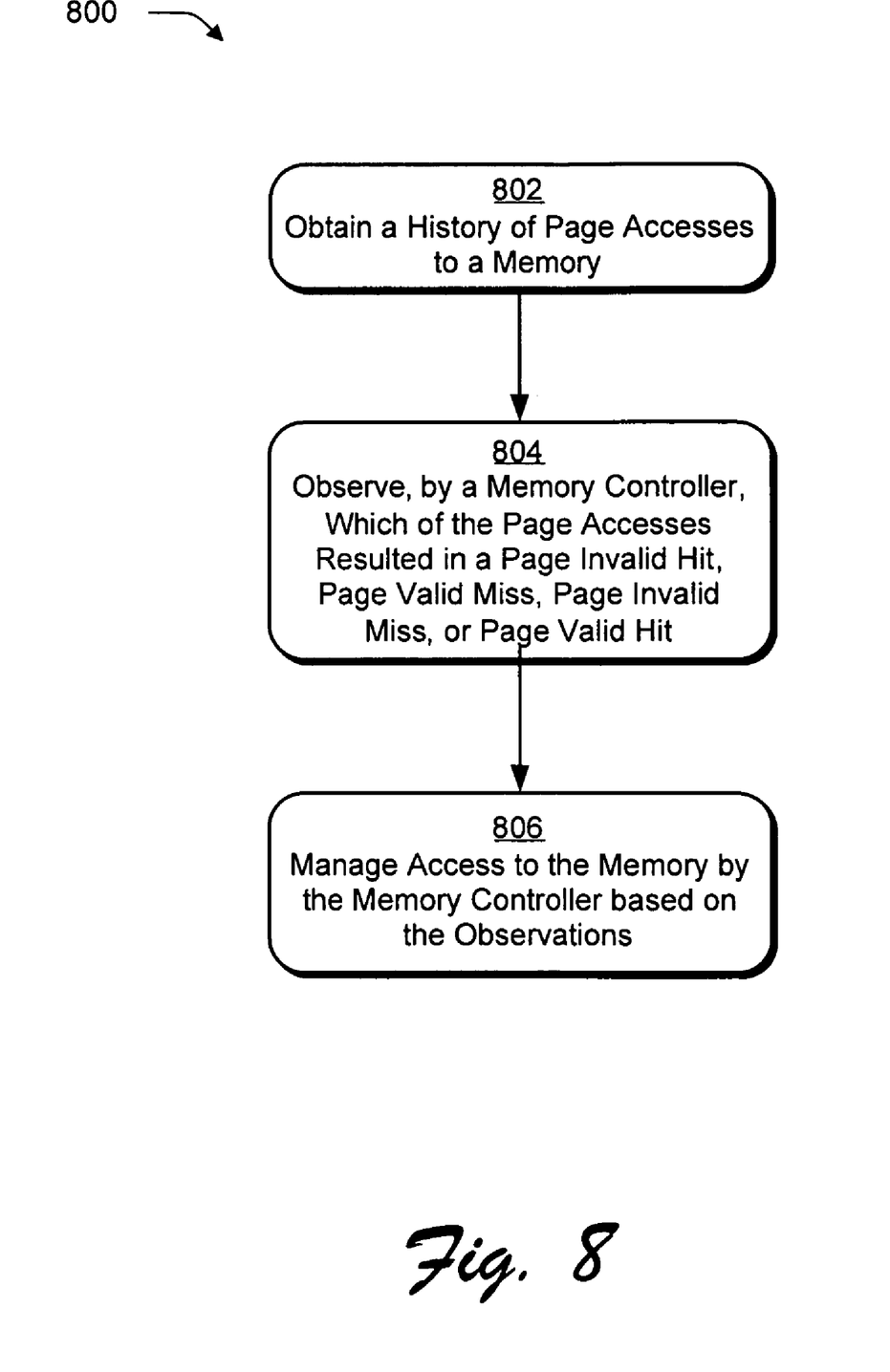
FIG. 8 is a flow diagram depicting a procedure in an exemplary implementation in which a history of page accesses is used to manage access to a memory.

FIG. 8 depicts a procedure 800 in an exemplary implementation that may be employed by the memory controller 108 of FIG. 1. A history of page accesses to a memory is obtained (block 802). For example, the page information tracker 204 may be utilized to track page accesses. Observations are made by a memory controller which of the page accesses results in a page invalid hit, a page valid miss, a page invalid miss or a page valid hit (block 804). Thus, the memory controller 108 may determine which of the decisions were "good" (e.g., a page invalid miss or page valid hit) or "bad" (e.g., page invalid hit or page valid miss). Access to the memory by the memory is managed based on the observations (block 806). For example, a scale-based technique may be used to transition between levels (i.e., slots) of a scale that includes a plurality of timeout values.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus comprising a memory controller to transition through a scale having a plurality of timeout values based on previous decisions made to close pages to a memory, wherein the memory controller comprises:
    a scoreboard, wherein the scoreboard is configured to track existence of pending requests stored in a queue to a memory to be processed by the memory controller; and
    a dynamic idle timer, wherein the dynamic idle timer comprises:
        an idle timer;
        a page information tracker;
        a dynamic update arbiter;
        a dynamic update tracker; and
        a page close scheduler.

2. An apparatus as described in claim 1, wherein the memory is dynamic random access memory (DRAM).

3. An apparatus as described in claim 1, wherein the memory controller is to transition from one said timeout value to another said timeout value that references a relatively lesser amount of time when a predetermined number of leveraged bad decisions over good decisions to close pages are encountered due to the one said timeout value referencing an amount of time that is too large.

4. An apparatus as described in claim 1, wherein the memory controller is to transition from one said timeout value to another said timeout value that references a relatively greater amount of time when a predetermined number of leveraged bad decisions over good decision are encountered due to the one said time value referencing an amount to time that is too small.

5. An apparatus as described in claim 1, wherein the memory controller is to transition from one said timeout value to another said timeout value that references an amount of time that is closer to a center of the scale when a good decision of a page invalid miss is observed.

6. An apparatus as described in claim 1, wherein the memory controller is to transition from one said timeout value to another said timeout value that references an amount of time that is closer to a center of the scale when a good decision of a page valid hit is observed.

7. An apparatus as described in claim 1, wherein the memory controller is to transition from one said timeout value to another said timeout value that references an amount of time that is closer to a center of the scale when a predetermined number of counts have occurred, during which, traffic between the memory and the memory controller has not happened.

8. An apparatus as described in claim 1, wherein a slot count that is used to transition through the scale is exponential.

9. An apparatus as described in claim 1, wherein the memory controller is to transition through the scale based on a variable sample size of the previous decisions.

10. An apparatus comprising a memory controller to use a scale-based technique to transition between a plurality of timeout values based on previous decisions made to close pages to the memory, wherein at least one said transition is to occur based on whether a predetermined number of counts have been reached, during which, the memory controller has not encountered memory traffic while a particular said page is closed to the memory, wherein the memory controller comprises:
- a scoreboard, wherein the scoreboard is configured to track existence of pending requests stored in a queue to a memory to be processed by the memory controller; and
- a dynamic idle timer, wherein the dynamic idle timer comprises:
  - an idle timer;
  - a page information tracker;
  - a dynamic update arbiter;
  - a dynamic update tracker; and
  - a page close scheduler.

11. An apparatus as described in claim 10, wherein the previous decisions include good decisions to close pages to the memory.

12. An apparatus as described in claim 11, wherein the good decisions include page invalid miss and page valid hit.

13. An apparatus as described in claim 10, wherein the previous decisions include bad decisions to close pages to the memory.

14. An apparatus as described in claim 13, wherein the bad decisions include page invalid hit and page valid miss.

15. A system comprising:
- a cursor control device;
- memory;
- a memory controller, communicatively coupled to the memory, to service a memory request and to use a scale-based technique to transition between a plurality of timeout values based on previous decisions made to close pages to the memory, wherein the memory controller comprises:
  - a scoreboard, wherein the scoreboard is configured to track existence of pending requests stored in a queue to a memory to be processed by the memory controller; and
  - a dynamic idle timer, wherein the dynamic idle timer comprises:
    - an idle timer;
    - a page information tracker;
    - a dynamic update arbiter;
    - a dynamic update tracker; and
    - a page close scheduler;
- a processor communicatively coupled to the cursor control device and the memory controller, wherein the processor is to provide the memory request in response to an input received from the cursor control device.

16. A system as described in claim 15, wherein the previous decisions include page invalid hit, page invalid miss, page valid hit and page valid miss.

17. A system as described in claim 15, wherein the memory controller includes:
- the dynamic update tracker configured to manage a scale to transition between timeout values; and
- the dynamic update arbiter configured to handle arbitration for ownership of the dynamic update tracker.

18. A method comprising:
- obtaining a history of page accesses to a memory;
- observing, by a memory controller, which of the page accesses results in a page invalid hit, page valid miss, page invalid miss or page valid hit, wherein the memory controller comprises:
  - a scoreboard, wherein the scoreboard is configured to track existence of pending requests stored in a queue to a memory to be processed by the memory controller; and
  - a dynamic idle timer, wherein the dynamic idle timer comprises:
    - an idle timer;
    - a page information tracker;
    - a dynamic update arbiter;
    - a dynamic update tracker; and
    - a page close scheduler;
- managing access to the memory by the memory controller based on the observations.

19. A method as described in claim 18, wherein the managing is performed by transitioning though a collection of slots, each collection having a timeout value.

20. A method as described in claim 18, wherein the managing is performed based on good decisions to close pages to memory as indicated by the page invalid miss and the page valid hit and bad decisions to close pages to the memory as indicated by the page invalid hit and page valid miss.

* * * * *